United States Patent
Hong et al.

(10) Patent No.: US 11,868,904 B2
(45) Date of Patent: Jan. 9, 2024

(54) PREDICTION MODEL TRAINING MANAGEMENT SYSTEM, METHOD OF THE SAME, MASTER APPARATUS AND SLAVE APPARATUS FOR THE SAME

(71) Applicant: University-Industry Cooperation Group of Kyung-Hee University, Yongin-si (KR)

(72) Inventors: Choong Seon Hong, Yongin-si (KR); Thar Kyi, Yongin-si (KR); Do Hyun Kim, Suwon-si (KR)

(73) Assignee: University-Industry Cooperation Group of Kyung-Hee University, Yongin-si (KR)

(*) Notice: Subject to any disclaimer, the term of this patent is extended or adjusted under 35 U.S.C. 154(b) by 1147 days.

(21) Appl. No.: 16/172,399

(22) Filed: Oct. 26, 2018

(65) Prior Publication Data

US 2020/0118007 A1    Apr. 16, 2020

(30) Foreign Application Priority Data

Oct. 15, 2018  (KR) .................. 10-2018-0122683

(51) Int. Cl.
G06N 5/02    (2023.01)
G06N 3/04    (2023.01)
G06N 3/08    (2023.01)

(52) U.S. Cl.
CPC .............. G06N 5/02 (2013.01); G06N 3/04 (2013.01); G06N 3/08 (2013.01)

(58) Field of Classification Search
CPC .............. G06N 5/02; G06N 3/04; G06N 3/08
See application file for complete search history.

(56) References Cited

U.S. PATENT DOCUMENTS

2007/0293959 A1* 12/2007 Takezawa ............ G05B 13/048
                                                    700/44
2016/0148104 A1*  5/2016 Itzhaky ................. G06V 20/10
                                                    706/12
(Continued)

FOREIGN PATENT DOCUMENTS

KR    10-2017-0068360 A    6/2017
KR    10-2017-0069138 A    6/2017
(Continued)

OTHER PUBLICATIONS

Brownlee—Display Deep Learning Model Training History in Keras (Year: 2016).*
(Continued)

*Primary Examiner* — Omar F Fernandez Rivas
*Assistant Examiner* — Shamcy Alghazzy
(74) *Attorney, Agent, or Firm* — Studebaker & Brackett PC

(57) ABSTRACT

Disclosed are a system and method for training and managing a prediction model, and a master apparatus and a slave apparatus for the same. there is provided a system for training and managing a prediction model, the system including a master apparatus configured to generate a prediction model, train the prediction model, and obtain the trained prediction model; and a slave apparatus configured to collect data, transmit the data to the master apparatus, receive the prediction model or the trained prediction model from the master apparatus, and operate based on the prediction model or the trained prediction model. The master apparatus is further configured to generate the prediction model or train the prediction model based on the data transmitted from the slave apparatus.

14 Claims, 7 Drawing Sheets

(56) References Cited

U.S. PATENT DOCUMENTS

| | | | |
|---|---|---|---|
| 2016/0162800 A1* | 6/2016 | Qin | G06N 3/0454 |
| | | | 706/12 |
| 2018/0329884 A1* | 11/2018 | Xiong | G06N 3/044 |
| 2018/0357736 A1* | 12/2018 | Sun | G06Q 50/30 |
| 2019/0042943 A1* | 2/2019 | Dasgupta | G06N 3/084 |
| 2019/0146759 A1* | 5/2019 | Chiang | G06N 5/003 |
| | | | 717/104 |
| 2019/0371307 A1* | 12/2019 | Zhao | G10L 15/26 |
| 2020/0005148 A1* | 1/2020 | Nori | G06N 3/084 |
| 2020/0057689 A1* | 2/2020 | Farahat | G06F 11/0751 |

FOREIGN PATENT DOCUMENTS

| | | |
|---|---|---|
| KR | 10-2017-0140214 A | 12/2017 |
| KR | 10-2018-0104213 A | 9/2018 |

OTHER PUBLICATIONS

Schlemper—A Deep Cascade of Convolutional Neural for MR Image Reconstruction (Year: 2017).*

* cited by examiner

PREDICTION MODEL TRAINING MANAGEMENT SYSTEM, METHOD OF THE SAME, MASTER APPARATUS AND SLAVE APPARATUS FOR THE SAME

CROSS-REFERENCE TO RELATED APPLICATIONS

This application claims the benefit under 35 USC § 119(a) of Korean Patent Application No. 10-2018-0122683 filed on Oct. 15, 2018 in the Korean Intellectual Property Office, the entire disclosure of which is incorporated herein by reference for all purposes.

BACKGROUND

1. Field

At least one example embodiment relates to a system and method for training and managing a prediction model, and a master apparatus and a slave apparatus for the same.

2. Description of Related Art

In recent years, artificial intelligence is used in various fields. Specifically, the artificial intelligence is applied in various fields, such as, for example, determining a next number of Go, recognizing characters, and translating one language to another language.

Artificial intelligence technology includes a machine learning. Here, the machine learning refers to a process of training a predetermined (or, alternatively, desired) algorithm based on a variety of information once the algorithm is given, and obtaining the trained algorithm based on a training result. That is, the machine learning refers to a process in which an apparatus, for example, a computer, generates rules by itself through direct training.

Meanwhile, in performing machine learning for intelligent management of network resources, a training process of an algorithm, for example, a prediction model, for such intent has some issues. Specifically, it is difficult to determine an appropriate learning model among various types of learning models, for example, a multilayer perceptron (MLP), a deep neural network (DNN), and a convolutional neural network (CNN). Also, conducting a search from among various types of learning models using different hyper parameters may cause a combination issue. Further, it is difficult to adjust and determine parameters, for example, a depth of a selected learning model, a type thereof, and a learning rate for enhancing accuracy of a prediction rate. Accordingly, there is a need for a method that may determine and obtain an appropriate prediction model for artificial management of network resources in technical, industrial, and economical aspects.

SUMMARY

At least one example embodiment provides a system and method for training and managing a prediction model, and a master apparatus and a slave apparatus for the same that may automate obtaining and training of an appropriate prediction model.

According to at least one example embodiment, there are provided a system and method for training and managing a prediction model, and a master apparatus and a slave apparatus for the same.

According to an aspect of at least one example embodiment, there is provided a system for training and managing a prediction model, the system including a master apparatus configured to generate a prediction model, train the prediction model, and obtain the trained prediction model; and a slave apparatus configured to collect data, transmit the data to the master apparatus, receive the prediction model or the trained prediction model from the master apparatus, and operate based on the prediction model or the trained prediction model. The master apparatus is further configured to generate the prediction model or train the prediction model based on the data transmitted from the slave apparatus.

The prediction model may include a first prediction model configured to obtain a prediction result about a class corresponding to input data; and a second prediction model configured to receive a result of the first prediction model and obtain a prediction result corresponding to the result of the first prediction model.

The first prediction model may include a first algorithm to which data is input and a second algorithm to which an output result of the first algorithm is input.

Each of the first algorithm and the second algorithm may include at least one of machine learning algorithms including at least one of a multilayer perceptron (MLP), a deep neural network (DNN), a convolutional neural network (CNN), a recurrent neural network (RNN), a convolutional recurrent neural network (CRNN), a deep belief network (DBN), and a deep Q-network.

The input data may be a tensor in which data is arranged in a multidimensional form.

The tensor may include a type of a feature and a data point around data to be predicted.

The slave apparatus may be further configured to train the prediction model or the trained prediction model independently of the master apparatus and transmit the training result to the master apparatus.

The master apparatus may be further configured to update the trained prediction model based on the training result.

At least one of the master apparatus and the slave apparatus may include a data processing configured to perform at least one processing of the collected data and generate a data set based on the collected data; a model generator configured to generate at least one prediction model; a model trainer configured to train the at least one prediction model generated by the model generator based on the data or the data set transferred by the data processing; a predictor configured to obtain a prediction result using at least one of the prediction model generated by the model generator and the prediction model trained by the model trainer; and an artificial intelligence manager configured to control and manage at least one of the data processing, the model generator, the model trainer, and the predictor.

According to an aspect of at least one example embodiment, there is provided a master apparatus including a communicator configured to communicably connect to a slave apparatus and receive data from the slave apparatus; and a processor configured to generate a prediction model, train the prediction model, and obtain the trained prediction model. The communicator is further configured to transmit the prediction model or the trained prediction model to the slave apparatus.

The processor may include a data processing configured to perform at least one processing of collected data and generate a data set based on the collected data; a model generator configured to generate at least one prediction model; and a model trainer configured to train the at least one prediction model generated by the model generator based on the data or the data set transferred by the data processing.

The prediction model may include a first prediction model configured to obtain a prediction result about a class corresponding to input data; and a second prediction model configured to receive a result of the first prediction model and obtain a prediction result corresponding to the result of the first prediction model.

The first prediction model may include a first algorithm to which data is input and a second algorithm to which an output result of the first algorithm is input.

Each of the first algorithm and the second algorithm may include at least one of machine learning algorithms including at least one of an MLP, a DNN, a CNN, an RNN, a CRNN, a DBN, and a deep Q-network.

The processor may further include a predictor configured to obtain a prediction result using at least one of the prediction model generated by the model generator and the prediction model trained by the model trainer.

The processor may further include an artificial intelligence manager configured to control and manage at least one of the data processing, the model generator, the model trainer, and the predictor.

According to an aspect of at least one example embodiment, there is provided a slave apparatus including a communicator configured to receive a prediction model or a trained prediction model from a master apparatus; and a processor configured to generate a control command based on the prediction model or the trained prediction model. The processor is further configured to train the prediction model or the trained prediction model, and the communicator is further configured to transmit the training result to the master apparatus.

The prediction model may include a first prediction model configured to obtain a prediction result about a class corresponding to input data; and a second prediction model configured to receive a result of the first prediction model and obtain a prediction result corresponding to the result of the first prediction model.

According to an aspect of at least one example embodiment, there is provided a method of training and managing a prediction model, the method including collecting, by at least one of a master apparatus and a slave apparatus, data; generating, by at least one of the master apparatus and the slave apparatus, a prediction model based on the data; training, by at least one of the master apparatus and the slave apparatus, the prediction model and obtaining the trained prediction model; and performing, by at least one of the master apparatus and the slave apparatus, a prediction based on at least one of the prediction model and the trained prediction model. The prediction model includes a first prediction model configured to obtain a prediction result about a class corresponding to input data; and a second prediction model configured to receive a result of the first prediction model and obtain a prediction result corresponding to the result of the first prediction model.

The first prediction model may include a first algorithm to which data is input, and a second algorithm to which an output result of the first algorithm is input. The first algorithm and the second algorithm may include at least one of machine learning algorithms including at least one of an MLP, a DNN, a CNN, an RNN, a CRNN, a DBN, and a deep Q-network.

According to some example embodiments, there are provided a system and method for training and managing a prediction model, and a master apparatus and a slave apparatus for the same that may automatically obtain a prediction model most appropriate for various types of predictions and train the obtained prediction model.

Also, according to some example embodiments, there are provided a system and method for training and managing a prediction model, and a master apparatus and a slave apparatus for the same that may relatively easily retrieve and select an optimal prediction model from among a plurality of prediction models.

Also, according to some example embodiments, there are provided a system and method for training and managing a prediction model, and a master apparatus and a slave apparatus for the same that enable a system having relatively low complexity to obtain an optimal prediction model from among a plurality of prediction models, thereby enhancing a system construction in an economical aspect.

Also, according to some example embodiments, there are provided a system and method for training and managing a prediction model, and a master apparatus and a slave apparatus for the same that may appropriately obtain a prediction model for predicting demand of a user and may perform intelligent management of network resources based on the obtained prediction model, thereby enhancing the resource use efficiency of a system.

Also, according to some example embodiments, there are provided a system and method for training and managing a prediction model, and a master apparatus and a slave apparatus for the same that may enhance the accuracy of an obtained prediction model.

Also, according to some example embodiments, there are provided a system and method for training and managing a prediction model, and a master apparatus and a slave apparatus for the same that may be applied to, for example, various types of electronic and mechanical devices, applications, and various types of services such as network management, in various application fields, such that each of the various apparatuses, applications, and services may easily and appropriately obtain a prediction model required for a corresponding operation.

Other features and aspects will be apparent from the following detailed description, the drawings, and the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
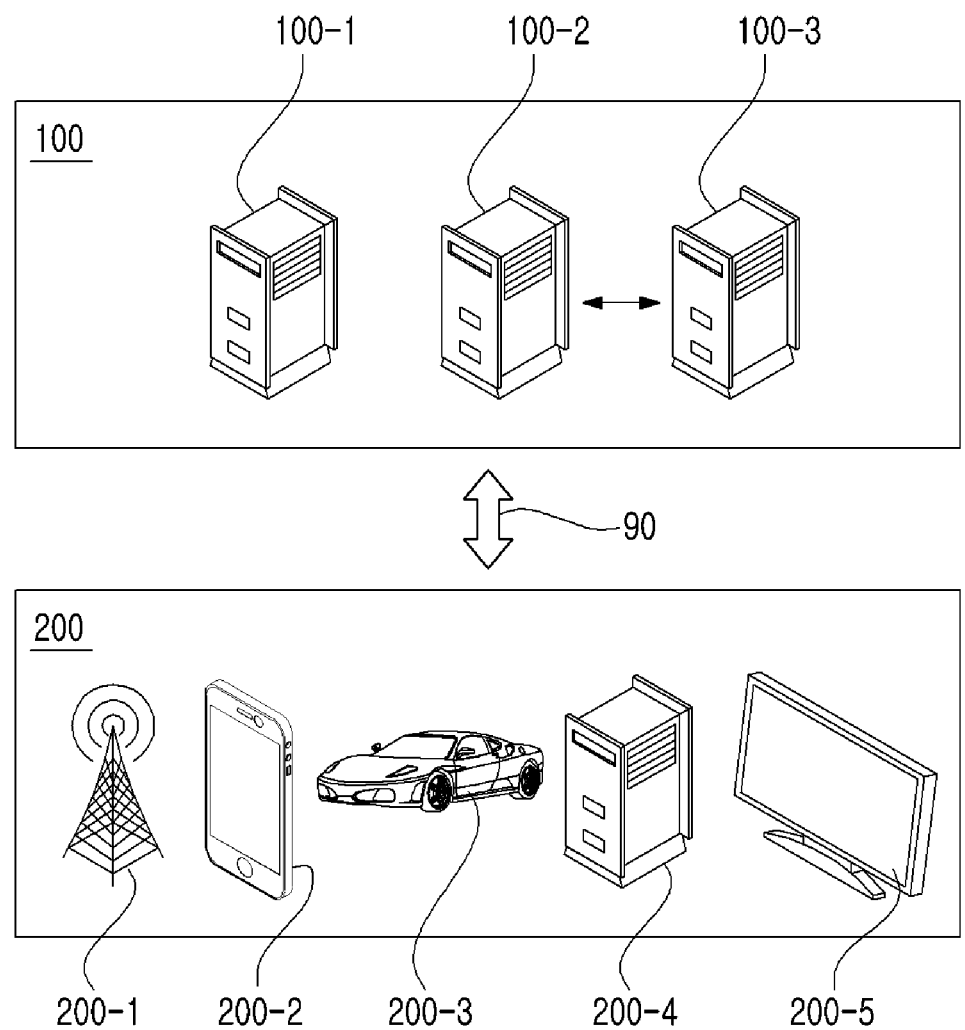
FIG. 1 illustrates an example of a system for training and managing a prediction model according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Unless the context clearly indicates otherwise, like reference numerals refer to like elements used throughout. Also, components used herein, such as, for example, terms '-unit/module', etc., may be implemented as software and/or hardware. Depending on example embodiments, each component with '-unit/module', etc., may be implemented as a single piece of software, hardware and/or a desired part, and also may be implemented as a plurality of pieces of software, hardware, and/or desired parts.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", "directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, a master apparatus and a slave apparatus for training and managing a prediction model and a system for training and managing a prediction model including the master apparatus and the slave apparatus will be described with reference to FIGS. 1 through 6.

FIG. 1 illustrates an example of a system (hereinafter, also referred to as a prediction model training management system) for training and managing a prediction according to an example embodiment.

Referring to FIG. 1, a prediction model training management system 1 may include a master node (hereinafter, referred to as a master apparatus) 100 and a slave node (hereinafter, referred to as a slave apparatus) 200 configured to communicate with the master apparatus 100.

The master apparatus 100 may be configured to generate a prediction model based on the collected data, train the prediction model, and select an optimal model. Here, the prediction model includes a model used to perform a prediction desired by a designer, for example, a prediction of user demand for a product, a service, an application, video or music contents, etc., a prediction for popularity about specific content, and a prediction of a preferred motion of a user for the master apparatus 100 and the slave apparatus 200. Further description related to generating and training the prediction model will be made below.

Referring to FIG. 1, the master apparatus 100 may include one or more computing apparatuses 100-1, 100-2, and 100-3. That is, the master apparatus 100 may be implemented using a single computing apparatus 100-1, or may be implemented two or more computing apparatuses 100-2 and 100-3. In the case of using two or more computing apparatuses 100-2 and 100-3, the computing apparatuses 100-2 and 100-3 may be communicably connected to each other. The computing apparatuses 100-1, 100-2, and 100-3 may include an electronic apparatus capable of performing operations and processing, and may be implemented using, such as, for example, a typical desktop computer, a laptop computer, and a server computer. Depending on example embodiments, the computing apparatuses 100-1, 100-2, and 100-3 may include an electronic apparatus, such as, for example, a smartphone, a tablet personal computer (PC), and home appliances connected to Internet of Things (IoT).

The slave apparatus 200 may receive the prediction model from the master apparatus 100 and process a predetermined (or, alternatively, desired) task or operation using the received prediction model. For example, the slave apparatus 200 may predict the popularity of content or a user demand for the content. Also, the slave apparatus 200 may receive a control command from the master apparatus 100 and operate in response to the received control command.

The slave apparatus 200 may collect various types of local data from a surrounding environment and transmit the collected local data to the master apparatus 100. Depending on example embodiments, the slave apparatus 200 may train the prediction model received from the master apparatus 100 independently of the master apparatus 100. That is, both of the master apparatus 100 and the slave apparatus 200 may be provided to process machine learning. In this case, the slave apparatus 200 may transmit the independently trained prediction model to the master apparatus 100. Information on the trained prediction model may include, for example, a weight and a gradient of the prediction model. In this case, when the master apparatus 100 receives local data from the slave apparatus 200 and/or the trained prediction model from the slave apparatus 200, the master apparatus 100 may update an existing prediction model by further training the existing prediction model based on the local data and/or the trained prediction model received from the slave apparatus 200.

The slave apparatus 200 may include one or more slave apparatuses 200-1, 200-2, 200-3, 200-4, and 200-5. In the case of using two or more slave apparatuses 200-1, 200-2, 200-3, 200-4, and 200-5, the slave apparatuses 200-1, 200-2, 200-3, 200-4, and 200-5 may be the same type of apparatuses or different types of apparatuses. Also, a portion of the slave apparatuses 200-1, 200-2, 200-3, 200-4, and 200-5 may be the same type of apparatuses and another portion thereof may be different types of apparatuses.

According to an example embodiment, the slave apparatus 200 may include, for example, a base station and a small cell station. For example, the slave apparatuses 200-1, 200-2, 200-3, 200-4, and 200-5 may include a smartphone, a vehicle, an electronic device, such as a navigation device, installed in the vehicle, a computer apparatus such as a desktop computer, a laptop computer, and a server computer, and home appliances, such as a digital television (TV) and a refrigerator, connected to IoT. In addition, the slave apparatus 200 may include, for example, a tablet PC, a smart watch, a head mounted display (MHD) device, a set-top box, a personal digital assistant (PDA), a portable game device, an electronic whiteboard, an electronic billboard, a sound player, and an automated teller machine (ATM). Also, in addition thereto, the slave apparatus 200 may include at least one of apparatuses capable of collecting data and performing operation processing depending on a selection of a designer.

Each of the master apparatus 100 and the slave apparatus 200 may transmit and receive data over a communication network 90. The communication network 90 may include a wired communication network, a wireless communication network, or a combination of the wired communication and the wireless communication network. Here, the wired communication network may include a communication network constructed using a cable that is provided using, alone or in combination, for example, a pair cable, a coaxial cable, an optical fiber cable, and an Ethernet cable. The wireless communication network may be implemented using, alone or in combination, a near field communication network and a long distance communication network. The near field communication network may be implemented based on an available near field communication network, such as, for example, wireless fidelity (WiFi), WiFi direct, Bluetooth, Bluetooth low energy (BLE), control area network (CAN) communication, ZigBee communication, and near field communication (NFC). The long distance communication network may be implemented based on an available mobile communication standard, for example, 3rd Generation Partnership Project (3GPP) such as evolved high speed packet access (HSPA+) and Long Term Evolution (LTE), 3GPP2 such as code division multiple access (CDMA2000), Worldwide Interoperability for Microwave Access (WiMAX), and wireless broadband (WiBro).

Figure 2:
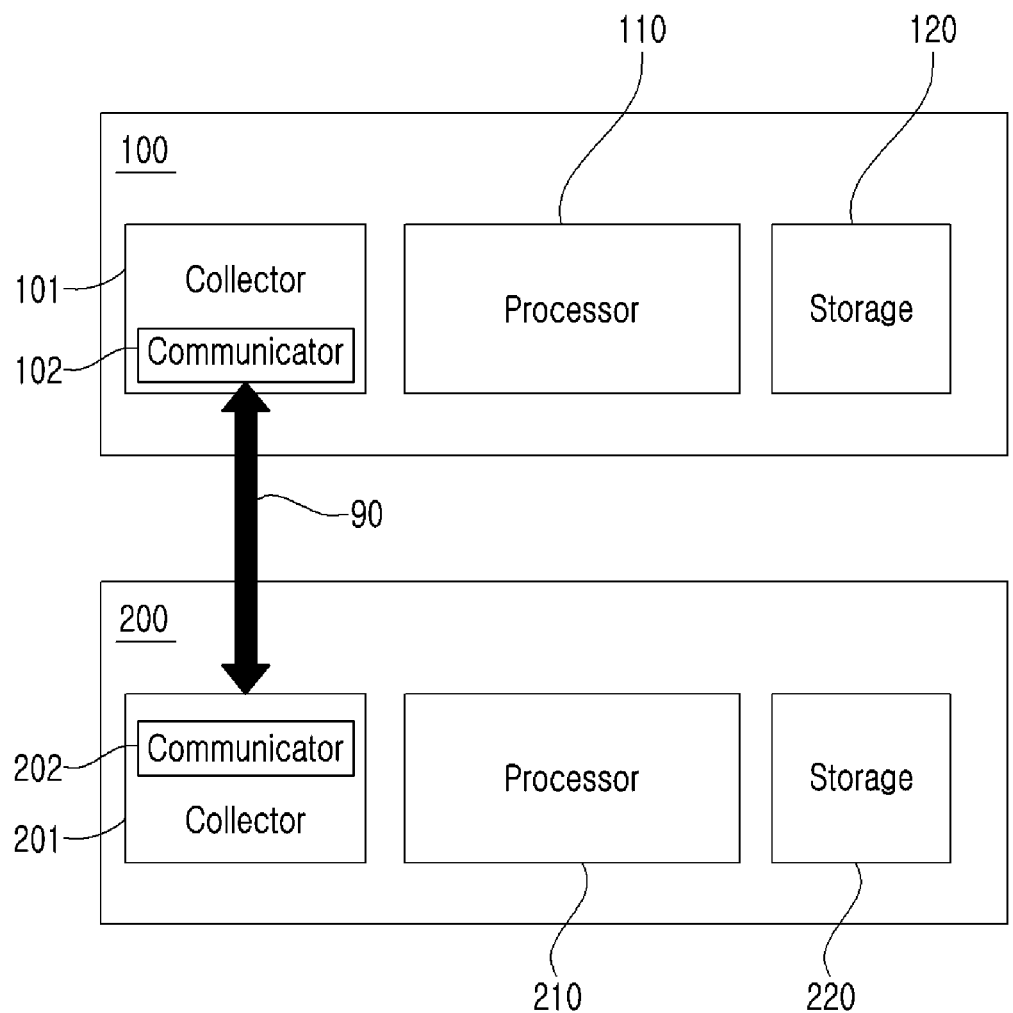
FIG. 2 is a block diagram illustrating an example of a system for training and managing a prediction model according to an example embodiment.

FIG. 2 is a block diagram illustrating an example of a prediction model training management system according to an example embodiment.

Referring to FIG. 2, the master apparatus 100 of the prediction model training management system 1 may include a collector 101, a processor 110, and a storage 120.

The slave apparatus 200 may include a communicator 202 and a processor 210. Also, the slave apparatus 200 may further include at least one of a collector 201 and a storage 220, if necessary.

The collector 101 of the master apparatus 100 may collect at least one piece of data used to generate and train a model.

For example, the collector 101 may collect various types of data. In this case, the collector 101 may include a communicator 102 configured to communicate with the communicator 202 of the slave apparatus 200. The communicator 102 may include a communication apparatus capable of receiving data over a communication network, which is described above. The communicator 102 may receive various types of data collected by the slave apparatus 200 from the slave apparatus 200. Also, the collector 101 may extract data from a database (not shown) constructed in advance separately, and may collect the extracted data. In addition, the collector 101 may include an input device, for example, a keyboard, a mouse, a touchscreen, a global positioning system (GPS) receiver, a punched card, an external memory slot, a camera, a microphone, and a device for receiving a variety of external information collected over an Internet network. The collector 101 may also collect data under control or operation of the input device.

Data collected by the collector 101 is not limited thereto. For example, data may include a command or an instruction selected by the user, content requested by the user, meta information, such as a category and class, of the selected command/instruction or the requested content, a number of times the command/instruction or the content is selected or requested, a date/season/time at which the command/instruction or the content is selected or requested, a data point around data to be predicted or a number of data points, and various items that may be used by the designer for prediction.

The variety of information collected by the collector 101 may be delivered to the processor 110 through an electronic circuit, a cable, and the like.

The processor 110 is configured to train and manage a prediction model and to perform various types of processing associated therewith. Also, the processor 110 is configured to generate and train the prediction model and to perform an operation based on the prediction model, for example, prediction for a request or a selection of the user.

In detail, for example, the processor 110 may control the collector 101 to extract data from the database, and to transfer a data transmission command to the slave apparatus 200 to transmit the collected data to the master apparatus 100. Alternatively, the processor 110 may call a necessary learning model from a model dictionary 121 of FIG. 3, may generate various types of prediction models or train a prediction model using various types of machine learning algorithms, and may transmit the generated prediction model or the trained prediction model to the slave apparatus 200. The processor 110 may determine and obtain a prediction result using the generated prediction model or the trained prediction model. Also, if necessary, the processor 110 may perform an operation corresponding to the prediction result. Alternatively, the processor 110 may transmit the prediction result to the slave apparatus 200, or may generate a command corresponding to the prediction result and transmit the generated command to the slave apparatus 200. Additionally, the processor 110 may control the overall operation of the master apparatus 100. Generation and training of the prediction model by the processor 110 is further described below.

The processor 110 may execute an application stored in a storage 120 to perform preset operation, determination, processing, and/or control operations. Here, the application stored in the storage 120 may be generated in advance by the designer and stored in the storage 120, or may be acquired or updated through an electronic software distribution network that is accessible over a wired or wireless communication network.

The processor 110 may be implemented using at least one electronic apparatus, such as, for example, a central processing unit (CPU), a micro controller unit (MCU), a microprocessor (Micom), an application processor (AP), an electronic controlling unit (ECU), and various types of other electronic apparatuses capable of performing various types of operation processing and generating a control signal. The apparatuses may be implemented using, for example, at least one semiconductor chip and relevant part.

The storage 120 is configured to transitorily or non-transitorily record and store a variety of applications and data required for operations of the processor 110 or desired to be recorded.

Figure 3:
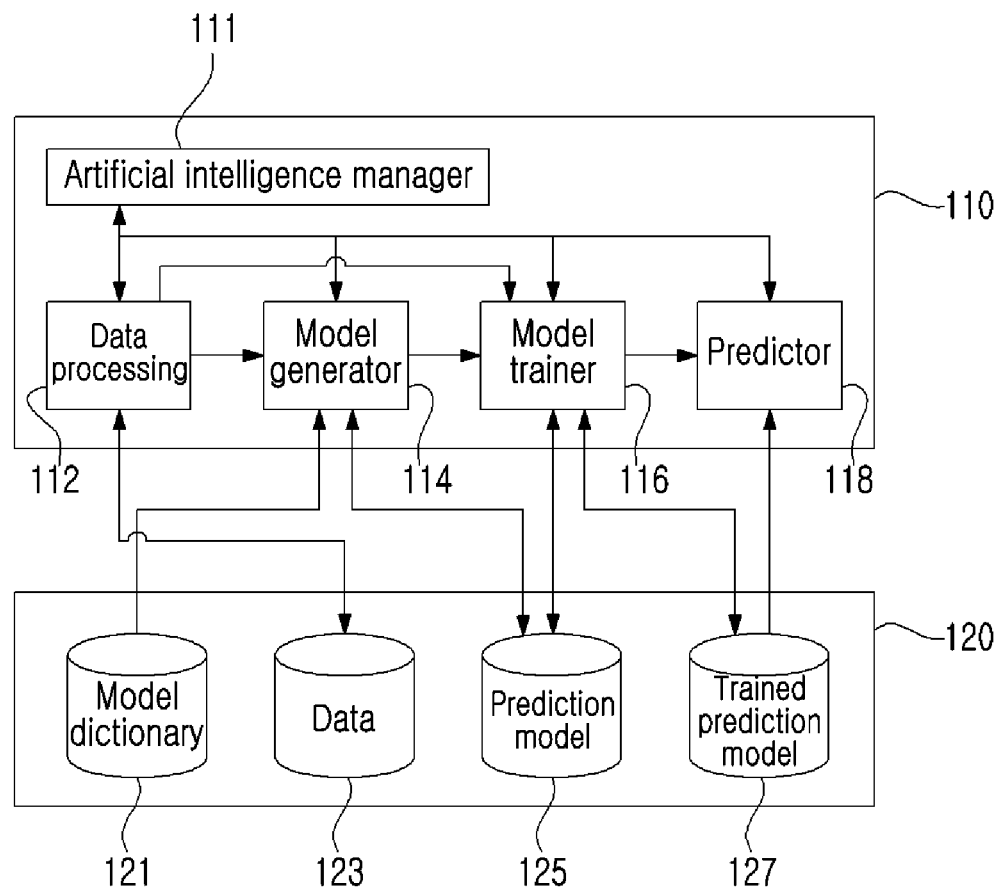
FIG. 3 is a block diagram illustrating an example of a master apparatus according to an example embodiment.

For example, referring to FIG. 3, the storage 120 may store the model dictionary 121, collected at least one piece of data 123 including raw data or preprocessed data, at least one generated or obtained prediction model 125, at least one trained prediction model 127, and/or a variety of information associated therewith. The variety of information associated therewith may include, for example, raw data and configuration information of a generated model or a trained model. Also, in the case of storing the prediction model 125 and the trained prediction model 127, the storage 120 may store, alone or in combination, hyper parameters of the prediction model 125 and the trained prediction model 127. The hyper parameter may include, for example, a number of hidden layers and a learning rate, as a parameter set to execute a machine learning.

The storage 120 may be implemented using one or more physical storage mediums, for example, a hard disk device. The aforementioned data and models may be stored in a single physical storage medium and may be distributively stored in a plurality of physical storage mediums. If necessary, a specific storage medium may be assigned to store each piece of and/or model.

The storage 120 may include at least one of a main memory and an auxiliary memory. The main memory may be implemented using semiconductor storage media, for example, read only memory (ROM) and random access memory (RAM). Examples of ROM may include typical ROM, erasable programmable read only memory (EPROM), electrically erasable and programable read only memory (EEPROM), and mask-ROM. Examples of RAM may include dynamic random access memory (DRAM) and static random access memory (SRAM). The auxiliary memory may be implemented using at least one storage media capable of permanently or semi-permanently storing data, such as, for example, a flash memory device, a secure digital (SD) card, a solid state drive (SSD), a hard disc drive (HDD), a magnetic drum, a compact disc (CD), optical media such as DVD or laser disc, a magnetic tape, magneto-optical media, and floppy disk.

According to an example embodiment, the communicator 202 of the slave apparatus 200 is configured to communicate with the communicator 102 of the master apparatus 100. The communicator 202 may receive a control command, data, and/or a prediction model from the communicator 102 of the master apparatus 100. Also, the communicator 202 may transmit, to the communicator 102 of the master apparatus 100, data collected by the collector 201, a prediction model generated directly or updated through training, information associated therewith, and/or a feedback signal corresponding to the control command. The communicator 202 of the slave apparatus 200 may be implemented using a communication apparatus capable of receiving data over a communication network, which is described above.

The collector 201 of the slave apparatus 200 may collect various types of data and transfer such collected information to the processor 210. For example, the collector 201 may obtain necessary data from various types of devices connected to the slave apparatus 200 and transfer the obtained information to the processor 210. Here, the various types of devices may refer to apparatuses capable of collecting a variety of information, such as, for example, a keyboard, a touchscreen, an external memory slot, a GPS receiver, a camera, a microphone, a steering wheel, a thermometer, and a hygrometer. Also, the collector 201 may collect a variety of external information received through the communicator 202 and transfer the collected external information to the processor 210. For example, the collector 201 may collect information of a base station, for example, a cache hit value or a count value indicating a number of times each piece of content is requested.

The processor 210 may perform various types of operation processing required for the overall operation of the slave apparatus 200 or may generate a control signal associated therewith. Depending on example embodiments, the processor 210 may perform operation processing and control operations in response to a control command generated by the processor 110 of the master apparatus 100.

According to an example embodiment, the processor 210 may generate and train a prediction model independently of the processor 110 of the master apparatus 100. In this case, the processor 210 may train the prediction model transmitted from the master apparatus 100 based on data collected by the collector 201 of the slave apparatus 200. Accordingly, the prediction model transmitted from the master apparatus 100 may be updated. As described above, training of the prediction model by the processor 210 may be performed independently of the processor 110 of the master apparatus 100. Depending on example embodiments, training of the prediction model by the processor 210 may be performed using the same method as one used by the processor 110 of the master apparatus 100 or using a method different therefrom.

Similar to the processor 110 of the master apparatus 100, the processor 210 may be implemented using at least one electronic apparatus.

The storage 220 may store various a variety of data or applications required for operations of the processor 210. For example, the storage 220 may transitorily or non-transitorily store a prediction model transferred from the master apparatus 100, and may transitorily or non-transitorily store a prediction model generated or trained by the processor 210.

Similar to the storage 120 of the storage 120, the storage 220 may include at least one of a main memory and an auxiliary memory, and may be implemented using, for example, a semiconductor and a magnetic disc.

Hereinafter, an example embodiment of generating and updating a prediction model in the master apparatus 100 and/or the slave apparatus 200 will be described with reference to FIGS. 3 through 5. In the following, a prediction model generation and training process performed by the master apparatus 100 according to an example embodiment will be described, which may be applicable to a prediction model generation and training process performed by the salve apparatus 200 in the same manner or through partial modifications. To avoid repetition, a further description related to the prediction model generation and/training process performed by the slave apparatus 200 is omitted herein.

FIG. 3 is a block diagram illustrating an example of a master apparatus according to an example embodiment.

Referring to FIG. 3, the processor 110 may include an artificial intelligence manager 111, a data processing 112, a model generator 114, a model trainer 116, and a predictor 118. The artificial intelligence manager 111, the data processing 112, the model generator 114, the model trainer 116, and the predictor 118 may be logically distinguished from each other or may be physically separate from each other. In the latter case, at least two of the artificial intelligence manager 111, the data processing 112, the model generator 114, the model trainer 116, and the predictor 118 may be implemented by different physical processors, for example, central processing units.

The artificial intelligence manager 111 is configured to control the overall operation or a portion of operation of the data processing 112, the model generator 114, the model trainer 116, and the predictor 118. For example, the artificial intelligence manager 111 may control the model generator 114 to generate or select appropriate data or prediction model, or may control the model trainer 116 to select and train the appropriate prediction model. Depending on example embodiments, the artificial intelligence manager 111 may perform and/or control training and selection of an optimal prediction model based on feedback information, for example, information on accuracy of a model or a learning loss of the model, transferred from at least one of the model trainer 116 and the predictor 118.

The data processing 112 may performing, for example, selection, extraction, processing, and deformation, on data, for example, a cache hit value or a count value indicating a number of times each piece of content is requested, collected by the data collector 101, or may generate a data set based thereon and transfer the data set to the model generator 114. Here, the collected data may refer to the data 123 that is stored in the storage 120. For example, the data processing 112 may clean a memory and may extract a log file from data. As another example, the data processing 112 may generate feature information by combining a plurality of pieces of data. The data or the data set processed by the data processing 112 may be transferred to the model generator 114 and/or the model trainer 116.

The model generator 114 may generate and obtain various types of prediction models. Here, the prediction model may be implemented using at least one of a multilayer perceptron (MLP), a deep neural network (DNN), a convolutional neural network (CNN), a recurrent neural network (RNN), a convolutional recurrent neural network (CRNN), a deep belief network (DBN), and a deep Q-network. In addition thereto or in replacement thereof, the prediction model may include various types of neural networks used for machine learning. If necessary, the model generator 114 may use the data or the generated data set processed by the data processing 112 for model generation. Also, the prediction model generated by the model generator 114 may refer to the prediction model 125 that is transitorily or non-transitorily stored in the storage 120.

As described above, to generate various types of prediction models, the model generator 114 may use the model dictionary 121 stored in the storage 120. The model dictionary 121 may refer to a data set constructed using rules and frames about various types of deep learning models, and is configured to provide at least one model to the model generator 114 in response to reading or search by the model generator 114.

The model trainer 116 may train the prediction model 125 that is generated by the model generator 114 using the data and/or data set transmitted from the data processing 112. In this case, the model trainer 116 may call the prediction model 125 stored in the storage 120, and may train the called prediction model 125 based on the obtained data and/or data set. A processing result of the model trainer 116 may be transferred to the storage 120. The storage 120 may store the trained prediction model 127 obtained from the model trainer 116, and may store a variety of information, for example, model configuration information, training accuracy and validation accuracy, associated with the trained prediction model 127. Here, such information may be transitorily or non-transitorily stored.

The predictor 118 may access the trained prediction model 127 stored in the storage 120, perform prediction based on the trained prediction model 127, and obtain a prediction result. Depending on example embodiments, the predictor 118 may store the prediction result in the storage 120, and may also transmit the prediction result to the artificial intelligence manager 111. Also, the predictor 118 may store information associated with the prediction, for example, prediction accuracy, in the storage 120, and may transmit information associated with the prediction to the artificial intelligence manager 111. According to an example embodiment, the artificial intelligence manager 111 may verify the prediction result or information associated with the prediction, for example, prediction accuracy, stored by the predictor 118 through access to the storage 120 or directly receive the prediction result or information associated with the prediction from the predictor 118 and perform a predetermined (or, alternatively, desired) operation based on the received prediction result or information associated with the prediction. For example, based on the prediction result or information associated with the prediction, the artificial intelligence manager 111 may generate a control command for at least one of the master apparatus 100 and the slave apparatus 200 and may control at least one of the master apparatus 100 and the slave apparatus 200 using the control command. According to an example embodiment, the artificial intelligence manager 111 may determine whether to further proceed with training or suspending the training based on information, for example, prediction accuracy. When the artificial intelligence manager 111 determines to suspend the training, a prediction model trained by a point in time at which the training is suspended may be stored in the storage 120. In this case, the prediction model trained by the point in time may be stored to be distinguished from the existing prediction model 125 or the other trained prediction model 127.

To retrieve an optimal prediction model, the processor 110 may detect the optimal prediction model using various methods. According to an example embodiment, the processor 110, for example, at least one of the artificial intelligence manager 111, the model generator 114, and the model trainer 116, may use a predetermined (or, alternatively, desired) search method to detect an optimal prediction model. The search method may include, for example, at least one of a grid search method and a random search method. The grid search method refers to a method of searching for an optimal model by sequentially increasing a value of a hyper parameter. The random search method refers to a method of randomly searching for an optimal model to reduce a search space.

In detail, the processor 110 may select a predetermined (or, alternatively, desired) candidate model. The candidate model may include, for example, a CNN, an RNN, and a CRNN. The processor 110 generates a model based on the search method, for example, the random search method.

According to an example embodiment, to minimize training/learning loss, the processor 110 may select an optimizer configured to calculate a gradient. The optimizer may use, for example, gradient descent, stochastic gradient descent, and adaptive moment estimation. For example, the adaptive moment estimation may be used as the optimizer to calculate a gradient of the CNN. In this case, a backpropagation algorithm may be further used in addition to the adaptive moment estimation. In the case of using long short-term memory (LSTM) models and/or regions with CNN features (R-CNN), truncated backpropagation through time (TBTT) may be further used to calculate a gradient. The TBTT may be used with the aforementioned adaptive moment estimation. The TBTT is enhanced from a backpropagation through time (BPTT) algorithm for RNN. In the TBTT, sequences are processed each one stage at a time and the BPTT algorithm is conversely updated during a fixed number of time slots.

As described above, the processor 110 may generate and train a prediction model and obtain a prediction result corresponding thereto. The processor 110 may predict an operation of the user, for example, a user demand for content, based on the obtained prediction result, and may appropriately and effectively manage various resources, for example, power to be used, a cache resource, and a computing resource, in the master apparatus 100 and the slave apparatus 200, based on the predicted operation.

Figure 4:
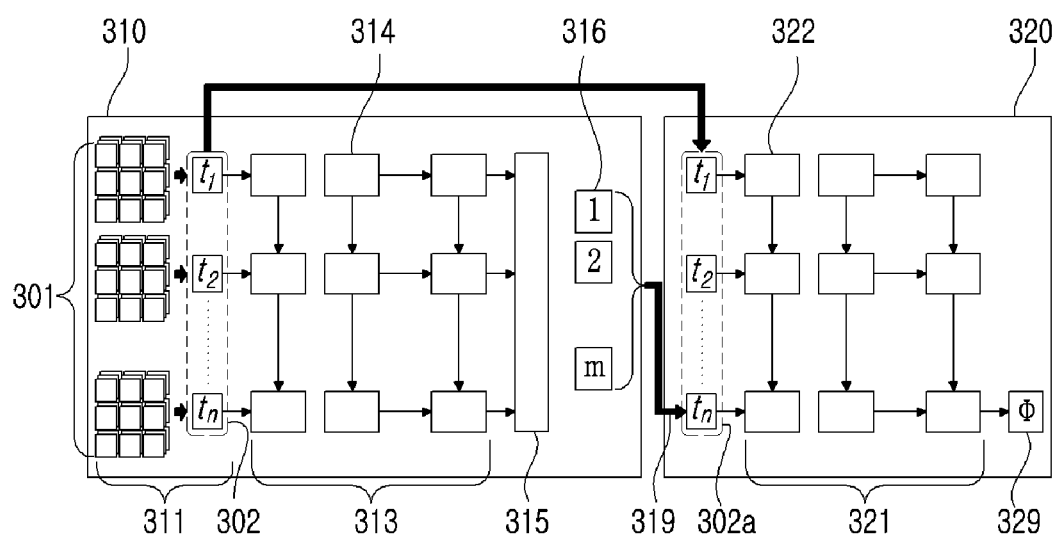
FIG. 4 illustrates an example of obtaining a prediction result according to an example embodiment.

FIG. 4 illustrates an example of obtaining a prediction result according to an example embodiment.

A prediction model 300 of FIG. 4 may be used by either the master apparatus 100 or the slave apparatus 200. Additionally, the prediction model 300 may be used by all of the master apparatus 100 and the slave apparatus 200. In the latter case, each of the master apparatus 100 and the slave apparatus 200 may independently use the prediction model 300.

Referring to FIG. 4, the prediction model 300 may include two prediction models, for example, a first prediction model 310 and a second prediction model 320.

The first prediction model 310 may be configured to predict, for example, a class. In detail, the first prediction model 310 may be used to predict a multi-class label.

The first prediction model 310 may include two algorithms, for example, a first algorithm 311 and a second algorithm 313. The first algorithm 311 and the second algorithm 313 sequentially process data. In detail, data 301 that is input to the first prediction model 310 is input to the first algorithm 311 and output data 302, for example, convolution result data, of the first algorithm 311 is sequentially input to the second algorithm 313. Depending on example embodiments, a result value, for example, class prediction data, of the second algorithm 313 may be processed by a fully connected layer (FCL) 315 and output through an output end 316. Therefore, the first prediction model 310 may acquire class prediction data 319. The acquired class prediction data 319 may be input to the second prediction model 320.

Each of the first algorithm 311 and the second algorithm 313 may use at least one of machine learning algorithms, for example, a neural network. For example, each of the first algorithm 311 and the second algorithm 313 may include a MLP, a DNN, a CNN, an RNN, a CRNN, a DBN, and a deep Q-network. Depending on example embodiments, the first algorithm 311 and the second algorithm 313 may be implemented using the same neural network or may be implemented using different neural networks.

For example, the first algorithm 311 may be implemented using a CNN and the second algorithm 313 may be implemented using an RNN. In this case, the data 301 is input to and then convolution-processed by the CNN of the first algorithm 311. Accordingly, the output data 302, for example, convolution result data, corresponding to the input data 301 is acquired. Depending on example embodiments, the convolution result data may be transferred to the second prediction model 320.

Once the convolution result data corresponding to the output data 302 is acquired, the convolution result data is input to the RNN of the second algorithm 313. The RNN of the second algorithm 313 may be specially designed for temporal dynamics of input sequential data. The RNN of the second algorithm 313 may include a plurality of RNN cells 314 that is connected to each other or disconnected. Depending on example embodiment, the RNN cell 314 may include, for example, a gated recurrent unit and long short-term memory. Data processed and output by the RNN of the second algorithm 313 is input to the fully connected layer 315.

The fully connected layer 315 may classify a class label of the input data 301 and the output end 316 may output result data, for example, the class prediction data 319. Here, the class prediction data 319 may be a multi-class label. The multi-class label may include a stochastic value. According to an example embodiment, cross-entropy may be used to classify a class label. Cross-entropy loss is general in a log-linear model and a neural network, and used to predict distribution of available labels. In the case of using the cross-entropy loss, output of the fully connected layer 315 may be transformed using a predetermined (or, alternatively, desired) transformation. For example, the output of the fully connected layer 315 may be transformed using softmax transformation or may be assumed to be transformed using the same. The class prediction data 319 may be transferred to the second prediction model 320.

Through the above process, the first prediction model 310 may output the class prediction data 319 learned by the CNN of the first algorithm 311 and the RNN of the second algorithm 313 to be transferred to the second prediction model 320.

The second prediction model 320 may be configured to obtain a prediction result. For example, the second prediction model 320 may be configured to predict a number of requests. Also, the second prediction model 320 may be configured to be suitable for various types of predictions. That is, the second prediction model 320 may be designed for a prediction desired by a designer based on an arbitrary selection of the designer.

The second prediction model 320 receives data 302*a* from the first prediction model 310 and processes the received data 302*a*. According to an example embodiment, the data 302*a* may be the output data 302 of the first algorithm 311, for example, the convolution result data, or may be the class prediction input data 319. Also, the received data 302*a* may include all of the convolution result data and the class prediction data 319.

The second prediction model 320 may include a third algorithm 321 configured to process the received data 302*a*. The third algorithm 321 may be configured using at least one of the aforementioned machine learning algorithms. For example, the third algorithm 321 may be implemented using an RNN. The RNN used as the third algorithm 321 may be specially designed for temporal dynamics of input sequential data and may include a plurality of RNN cells 322.

Result data processed by the second prediction model 320, for example, the RNN is output to an output end 329. Here, the result data includes data about a desired prediction result, for example, a number of requests. Therefore, a prediction result about a target desired by the designer may be obtained. The processor 110 of FIG. 2, for example, the artificial intelligence manager 111 of the processor 110 may appropriately manage at least one master apparatus 100 and/or at least one slave apparatus 200 based on the obtained prediction result.

The second prediction model 320 may obtain a loss using a method selected by the designer. For example, the second prediction model 320 may measure a loss for a result, for example, a prediction for a number of requests, using a mean square error (MSE). The MSE may further easily calculate a gradient with an excellent mathematical characteristic.

Hereinafter, data, for example, the data 302, 302a, used by the prediction model 300 will be further described.

Figure 5:
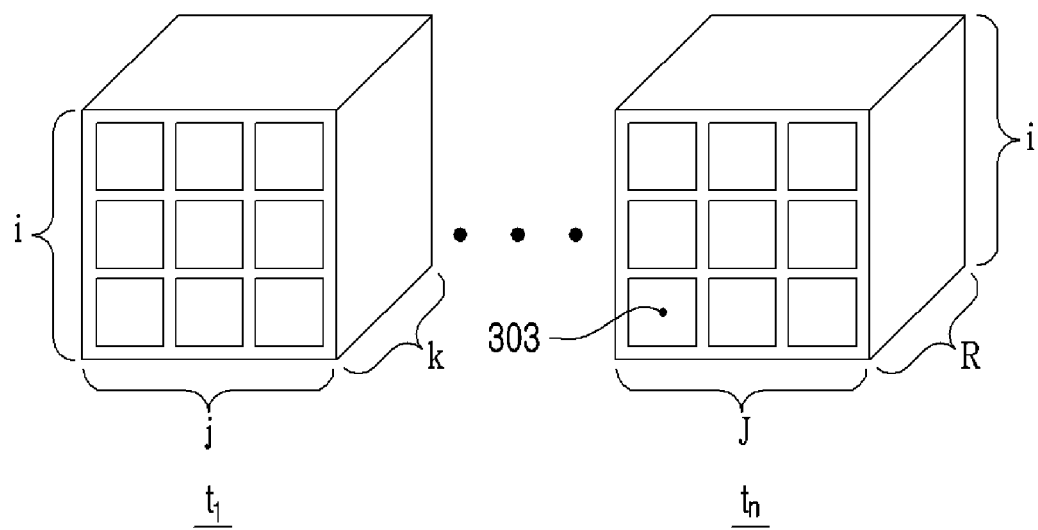
FIG. 5 illustrates an example of sample data according to an example embodiment.

FIG. 5 illustrates an example of sample data according to an example embodiment. In FIG. 5, each of $t_1$ to $t_n$ denotes a time slot and n denotes a number of a corresponding time slots.

As described above, in the prediction model 300, a variety of data, for example, sample data is input to the first algorithm 311, the second algorithm 313, and the third algorithm 321. For example, in the first prediction model 310, the data 301 may be input to the first algorithm 311 and the convolution result data corresponding to the output data 302 may be input to the second algorithm 313. In the second prediction model 320, the data 302a may be input to the third algorithm 321.

The sample data, for example, the data 301, the convolution result data corresponding to the output data 302, and the data 302a, used in the prediction model 300 may be configured based on a tensor in which data is multi-dimensionally arranged as shown in FIG. 5. The tensor may be obtained at each specific point in time slot ($t_1$ to $t_n$). That is, data may be input or generated in a form of the tensor in each of time slots $t_1$, $t_n$, and $t_m$ therebetween. Here, $t_m$ denotes a time slot between $t_1$ and $t_n$, and 1<m<n. The tensor may be a set of an i×j×k number of pieces of data. In detail, the tensor may include i×j×k slots capable of including data, for example, a number of requests for specific content or a number of selections on a specific command. Desired data may be recorded or not recorded in each slot. If the tensor relates to feature information, the tensor may include desired data, such as a type of a feature (e.g., a name of content, a number of requests, and a grade of content if the content is movie), or a data point around data to be predicted. In this case, i may be defined to denote a number of input data values for each feature type. Also, j may be defined to denote a number of types of features and k may be defined to denote a number of data points around data. It is provided as an example only, and thus the tensor may be variously defined based on an arbitrary selection of the designer.

Hereinafter, a method (hereinafter, also referred to as a prediction model training management method) of training and managing a prediction model according to an example embodiment will be described with reference to FIGS. 6 and 7.

Figure 6:
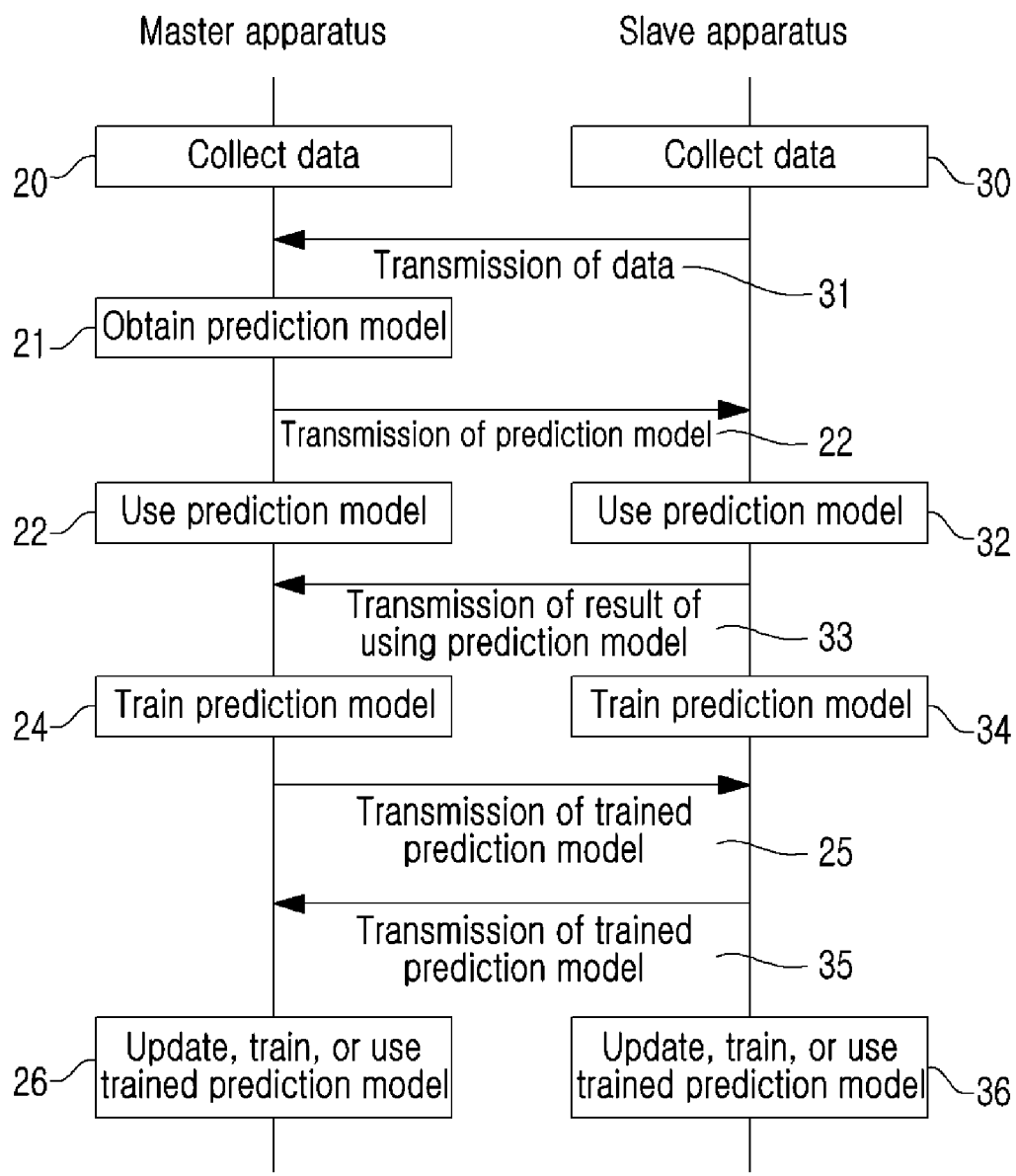
FIG. 6 illustrates an example of a method of training and managing a prediction model according to an example embodiment.

FIG. 6 illustrates an example of a prediction model training management method according to an example embodiment.

The prediction model training management method may be performed based on the aforementioned prediction model training management system. That is, the prediction model training management method may be performed by at least one of a master apparatus and a slave apparatus. Describing an example embodiment of the prediction model training management method of FIG. 6, at least one of the master apparatus and the slave apparatus may collect a variety of data, for example, information, required for or associated with prediction. In this case, the master apparatus and the slave apparatus may collect data independently or through cooperation. Depending on example embodiments, one of data collection operation 20 by the master apparatus and data collection operation 30 by the slave apparatus may be omitted.

In operation 31, the slave apparatus may transmit the collected data to the master apparatus and the master apparatus may receive the data.

In operation 21, the master apparatus may obtain and generate a prediction model based on at least one of data directly collected by the master apparatus and the data received from the slave apparatus. Here, the master apparatus may use either the data collected by the master apparatus or the data received from the slave apparatus.

In operation 22, the prediction model obtained by the master apparatus may be transmitted to the slave apparatus. In operation 32, once the prediction model is received, the slave apparatus may perform various types of operations, for example, a prediction of demand, using the received prediction model. The slave apparatus may also transmit information on a result of using the prediction model to the master apparatus. For example, in operation 33, the slave apparatus may transmit information on accuracy of the prediction model to the master apparatus. In operation 24, the master apparatus may use the received information to train the prediction model. Also, in operation 23, the master apparatus may use the generated and obtained prediction model, if necessary. Depending on example embodiments, operations 22, 23, and 32 may be omitted.

In operation 24, the master apparatus may train the prediction model. In detail, the master apparatus may train the generated prediction model and may store a setting value, training accuracy, and validation accuracy of the prediction model.

Once the prediction model is trained, the master apparatus may transmit the trained prediction model to the slave apparatus in operation 25 and the slave apparatus may use the trained prediction model or may further train the prediction model if necessary in operation 36. Also, the slave apparatus may update an existing stored trained model.

In operation 34, the slave apparatus may also train the prediction model. In detail, in operation 34, the slave apparatus may train the prediction model that is transmitted from the master apparatus in operation 22 based on the data that is directly collected by the slave apparatus in data collection operation 30. Therefore, the slave apparatus may obtain the trained prediction model. In operation 35, the prediction model trained by the slave apparatus may be transmitted to the master apparatus. Depending on a selection of a designer, the slave apparatus may transmit information associated with the prediction model, for example, a weight and a gradient, to the master apparatus instead of transmitting the prediction model thereto.

Once the trained prediction model is received from the slave apparatus in operation 35, the master apparatus may update the existing trained prediction model based on the received trained model prediction in operation 26. The trained prediction model that is received from the salve apparatus in operation 35 may be discarded without being updated based on settings of the master apparatus. If necessary, the master apparatus may further train the trained prediction model that is received the slave apparatus and/or may use the same to perform a desired operation.

Through the above process, the prediction model may be trained by at least one of the master apparatus and the slave apparatus, thereby further enhancing the accuracy of the prediction model.

Figure 7:
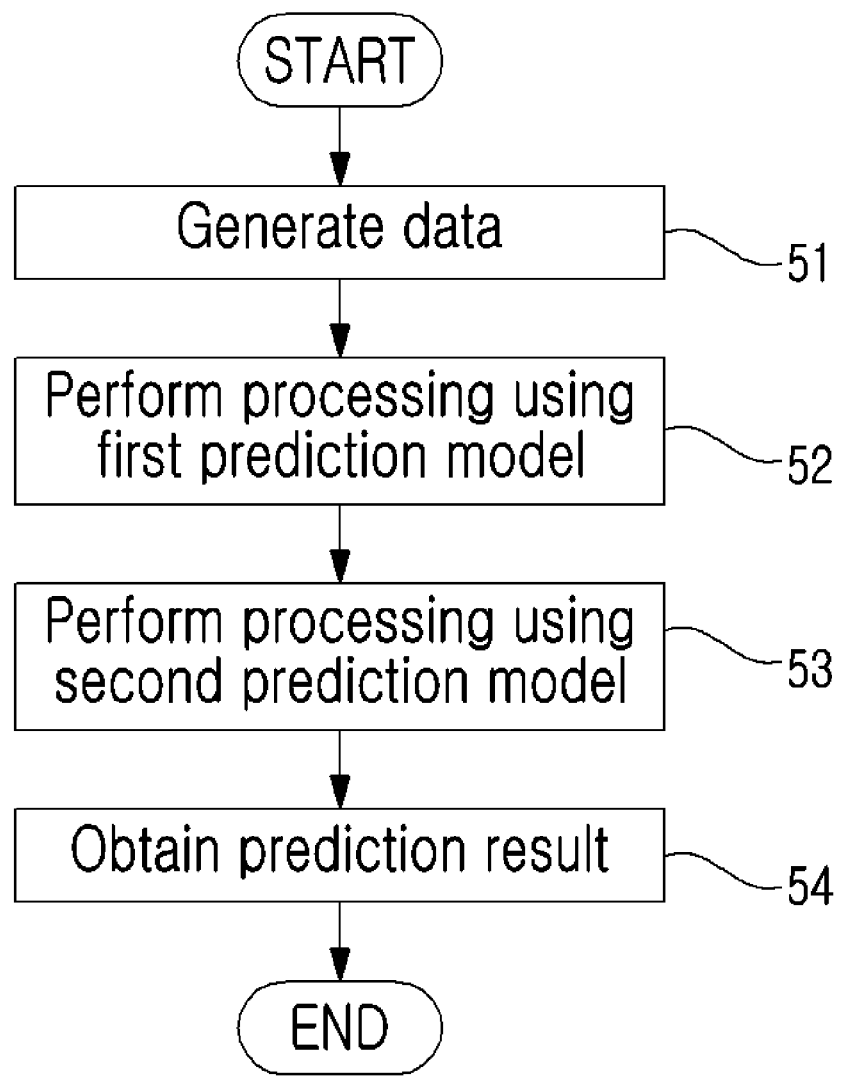
FIG. 7 is a flowchart illustrating an example of a process of obtaining a prediction result according to an example embodiment.

FIG. 7 is a flowchart illustrating a process of obtaining a prediction result according to an example embodiment.

The process of obtaining a prediction result of FIG. 7 may be performed by at least one of a master apparatus and a slave apparatus. Also, a portion of the process may be performed by the master apparatus and another portion of the process may be performed by the slave apparatus.

Referring to FIG. 7, in operation 51, data may be generated. The data may include sample data in a tensor form of FIG. 5. The data may be input to a prediction model. Here, the prediction model may include a first prediction model and a second prediction model. In this case, as described above with reference to FIG. 4, the data may be initially input to the first prediction model.

In operation 52, the first prediction model may process the input data by applying at least one algorithm. The first prediction model may refer to a model to predict a class, for example, a multi-class label. The algorithm may include a neural network. Also, the first prediction model may be implemented using two neural networks that are sequentially used. For example, the first prediction model may be implemented using a CNN and an RNN. In this case, the data may be input to the CNN and convolutionally processed and then input to the RNN. Also, the first prediction model may include a fully connected layer (FCL) for classifying a class label. A value output from the RNN may be input to the fully connected layer and the fully connected layer may output class prediction data. Thus, the first prediction model may output final class prediction data.

The second prediction model may include a model configured to obtain a prediction result. In operation 53, the second prediction model may process the class prediction data output from the first prediction model by applying at least one algorithm thereto. The second prediction model may input the class prediction data to the RNN and may output result data. Here, the result data may include a prediction result about a target desired by the designer. That is, the result data may include a final prediction result.

In operation 54, an appropriate prediction result may be obtained.

The prediction model training management methods and/or the prediction result obtaining methods according to the example embodiments may be implemented in a form of a program executable by a computer apparatus. For example, the program may include, alone or in combination with program instructions, data files, data structures, and the like. The program may be designed and manufactured using a machine code or a higher level code. The program may be specially designed to implement the example embodiments and may be implemented using functions (including a library function) kind well-known and available to those having skill in the computer software arts. Also, a computer apparatus in which the program is executable may include a processor, a memory, and the like to implement functions of the program.

The program for implementing the example embodiments may be recorded in non-transitory computer-readable media. Examples of the non-transitory computer-readable media may include magnetic media such as hard discs and floppy discs; optical media such as CD-ROM discs and DVDs; magneto-optical media such as floptical discs; and hardware apparatus that are specially configured to store and perform a specific program executed in response to call of a computer, such as ROM, RAM, flash memory.

At least one of the prediction model training management system 1, the master apparatus 100, the slave apparatus 200, and the prediction model training management method may be adopted alone or in combination in various fields. For example, the prediction model training management system 1, the master apparatus 100, the slave apparatus 200 and/or the prediction model training management method may be used to implement a variety of techniques such as a video on demand (VOD) service, a video streaming service, edge computing, intelligent network management, a virtualized network, and IoT. In detail, the aforementioned systems, apparatuses, and methods may be used for content caching of the techniques.

A number of example embodiments regarding the prediction model training management system, the prediction model training management method, and the master apparatus and the slave apparatus for the same have been described above. Nonetheless, it should be understood that various modifications may be made to these example embodiments. For example, various apparatuses or methods achieved by one of ordinary skill in the art through alterations and modifications thereto may be an example embodiment of the prediction model training management system, the prediction model training management method, and the master apparatus and the slave apparatus for the same. For example, suitable results may be achieved if the described techniques are performed in a different order and/or if components in a described system, architecture, apparatus, or circuit are combined in a different manner and/or replaced or supplemented by other components or their equivalents. Accordingly, other implementations are still within the scope of the following claims.

What is claimed is:

1. A system for training and managing a prediction model, the system comprising:
a master apparatus comprising a hardware processor and a hardware storage,
wherein the hardware processor of the master apparatus is configured to
generate a prediction model,
train the prediction model, and
obtain the trained prediction model; and
a slave apparatus comprising a hardware processor and a hardware storage,
wherein the hardware processor of the slave apparatus is configured to collect data,
transmit the data to the master apparatus,
receive the prediction model or the trained prediction model from the master apparatus, and
operate based on the prediction model or the trained prediction model,
wherein the hardware processor of the master apparatus is further configured to generate the prediction model or train the prediction model based on the data transmitted from the slave apparatus,
wherein the prediction model comprises:
a first prediction model configured to obtain a prediction result about a class corresponding to input data; and a second prediction model configured to receive a result of the first prediction model and obtain a prediction result corresponding to the result of the first prediction model, wherein the first prediction model comprises a first algorithm to which first data is input and a second algorithm to which an output result of the first algorithm is input, wherein the hardware storage of the master apparatus is configured to store feedback information that includes information on training accuracy and learning loss of a respective model, and wherein:
the first algorithm is implemented using a convolutional neural network (CNN), and the second algorithm is implemented using a recurrent neural network (RNN), which is designed for temporal dynamics of input sequential data and includes a plurality of RNN cells;
the first data is inputted to and then convolution-processed by the CNN of the first algorithm, second data, which is convolution result data, is acquired, and the second data is input to the RNN of the second algorithm; and
third data, which is output data of the RNN, is transferred to the second prediction model.

2. The system of claim 1, wherein the input data is a tensor in which data is arranged in a multidimensional form.

3. The system of claim 2, wherein the tensor comprises a type of a feature and a data point around data to be predicted.

4. The system of claim 1, wherein the slave apparatus is further configured to train the prediction model or the trained prediction model independently of the master apparatus and transmit the training result to the master apparatus.

5. The system of claim 4, wherein the master apparatus is further configured to update the trained prediction model based on the training result.

6. The system of claim 1, wherein at least one of the master apparatus and the slave apparatus comprises:
a data processing configured to perform at least one processing of the collected data and generate a data set based on the collected data;
a model generator configured to generate at least one prediction model;
a model trainer configured to train the at least one prediction model generated by the model generator based on the data or the data set transferred by the data processing;
a predictor configured to obtain a prediction result using at least one of the prediction model generated by the model generator and the prediction model trained by the model trainer; and
an artificial intelligence manager configured to control and manage at least one of the data processing, the model generator, the model trainer, and the predictor.

7. The system of claim 1, wherein the second prediction model includes a third algorithm configured to process the third data received from the first prediction model, and
wherein the third algorithm is implemented using an RNN, which is designed for temporal dynamics of input sequential data and includes a plurality of RNN cells.

8. A master apparatus comprising:
a hardware processor configured to
receive data from a slave apparatus,
generate a prediction model,
train the prediction model,
obtain the trained prediction model, and
transmit the prediction model or the trained prediction model to the slave apparatus; and
a hardware storage,
wherein the prediction model comprises:
a first prediction model configured to obtain a prediction result about a class corresponding to input data; and
a second prediction model configured to receive a result of the first prediction model and obtain a prediction result corresponding to the result of the first prediction model,
wherein the first prediction model comprises a first algorithm to which first data is input and a second algorithm to which an output result of the first algorithm is input,
wherein the hardware storage of the master apparatus is configured to store feedback information that includes information on training accuracy and learning loss of a respective model, and
wherein:
the first algorithm is implemented using a convolutional neural network (CNN), and the second algorithm is implemented using a recurrent neural network (RNN), which is designed for temporal dynamics of input sequential data and includes a plurality of RNN cells;
the first data is inputted to and then convolution-processed by the CNN of the first algorithm, second data, which is convolution result data, is acquired, and the second data is input to the RNN of the second algorithm; and
third data, which is output data of the RNN, is transferred to the second prediction model.

9. The master apparatus of claim 8, wherein the processor comprises:
a data processing configured to perform at least one processing of collected data and generate a data set based on the collected data;
a model generator configured to generate at least one prediction model; and
a model trainer configured to train the at least one prediction model generated by the model generator based on the data or the data set transferred by the data processing.

10. The master apparatus of claim 9, wherein the processor further comprises:
a predictor configured to obtain a prediction result using at least one of the prediction model generated by the model generator and the prediction model trained by the model trainer.

11. The master apparatus of claim 10, wherein the processor further comprises:
an artificial intelligence manager configured to control and manage at least one of the data processing, the model generator, the model trainer, and the predictor.

12. The master apparatus of claim 8, wherein the second prediction model includes a third algorithm configured to process the third data received from the first prediction model, and
wherein the third algorithm is implemented using an RNN, which is designed for temporal dynamics of input sequential data and includes a plurality of RNN cells.

13. A method of training and managing a prediction model, the method comprising:

collecting, by at least one of a master apparatus including a hardware processor and a hardware storage, and a slave apparatus including a hardware processor and a hardware storage, data;

generating, by at least one of the master apparatus and the slave apparatus, a prediction model based on the data;

training, by at least one of the master apparatus and the slave apparatus, the prediction model and obtaining the trained prediction model; and performing, by at least one of the master apparatus and the slave apparatus, a prediction based on at least one of the prediction model and the trained prediction model, wherein the prediction model comprises:
- a first prediction model configured to obtain a prediction result about a class corresponding to input data; and
- a second prediction model configured to receive a result of the first prediction model and obtain a prediction result corresponding to the result of the first prediction model, wherein the first prediction model comprises a first algorithm to which first data is input and a second algorithm to which an output result of the first algorithm is input, wherein the hardware storage of the master apparatus stores feedback information that includes information on training accuracy and learning loss of a respective model, and wherein:
- the first algorithm is implemented using a convolutional neural network (CNN), and the second algorithm is implemented using a recurrent neural network (RNN), which is designed for temporal dynamics of input sequential data and includes a plurality of RNN cells;
- the first data is inputted to and then convolution-processed by the CNN of the first algorithm, second data, which is convolution result data, is acquired, and the second data is input to the RNN of the second algorithm; and
- third data, which is output data of the RNN, is transferred to the second prediction model.

14. The method of claim 13, wherein the second prediction model includes a third algorithm configured to process the third data received from the first prediction model, and
wherein the third algorithm is implemented using an RNN, which is designed for temporal dynamics of input sequential data and includes a plurality of RNN cells.

* * * * *